United States Patent
Xiong et al.

(10) Patent No.: US 11,657,778 B2
(45) Date of Patent: May 23, 2023

(54) ON DEMAND DISPLAY SOURCE PRESENTATION AT A PARTIAL DISPLAY AREA

(71) Applicant: Dell Products L.P., Round Rock, TX (US)

(72) Inventors: Dengzhai Xiong, Singapore (SG); Eng Soon Tan, Singapore (SG)

(73) Assignee: Dell Products L.P., Round Rock, TX (US)

( * ) Notice: Subject to any disclaimer, the term of this patent is extended or adjusted under 35 U.S.C. 154(b) by 126 days.

(21) Appl. No.: 17/472,035

(22) Filed: Sep. 10, 2021

(65) Prior Publication Data
US 2023/0081535 A1    Mar. 16, 2023

(51) Int. Cl.
| | |
|---|---|
| G09G 5/02 | (2006.01) |
| G09G 5/00 | (2006.01) |
| G09G 5/14 | (2006.01) |
| G09G 5/373 | (2006.01) |
| G09G 5/391 | (2006.01) |

(52) U.S. Cl.
CPC ............... *G09G 5/006* (2013.01); *G09G 5/14* (2013.01); *G09G 5/373* (2013.01); *G09G 5/391* (2013.01); *G09G 2310/08* (2013.01); *G09G 2360/18* (2013.01); *G09G 2370/18* (2013.01)

(58) Field of Classification Search
CPC .......... G09G 5/006; G09G 5/14; G09G 5/373; G09G 5/391
USPC ......................................................... 345/698
See application file for complete search history.

(56) References Cited

U.S. PATENT DOCUMENTS

| | | | |
|---|---|---|---|
| 9,253,497 B2 | 2/2016 | Hattori et al. | |
| 9,501,855 B2 | 11/2016 | Aiba et al. | |
| 9,525,847 B2 | 12/2016 | Yang et al. | |
| 10,848,729 B2 | 11/2020 | Borer et al. | |
| 11,081,137 B2 | 8/2021 | Xiao et al. | |
| 2009/0225224 A1* | 9/2009 | Sung | H04N 5/45 348/565 |
| 2011/0305442 A1* | 12/2011 | Hu | H04N 5/76 386/355 |
| 2013/0326142 A1* | 12/2013 | Sato | G06K 19/077 711/115 |
| 2014/0306957 A1* | 10/2014 | Herrick | G09G 5/00 345/422 |
| 2019/0007656 A1* | 1/2019 | Levi | H04N 21/2187 |

\* cited by examiner

*Primary Examiner* — Jonathan M Blancha
(74) *Attorney, Agent, or Firm* — Zagorin Cave LLP; Robert W. Holland

(57) ABSTRACT

A display presents picture-in-picture and/or picture-by-picture formatted visual information initiated by secondary information handling systems while the display presents primary visual information. The display broadcasts plural partial video buffer definitions to plural information handling systems that can selectively initiate network sessions to present visual images in areas of the display by storage of visual image information in a portion of the display video buffer. The secondary display area may present visual images for IoT or similar headless devices having relevance to an end user of a primary information handling system.

20 Claims, 5 Drawing Sheets

ON DEMAND DISPLAY SOURCE PRESENTATION AT A PARTIAL DISPLAY AREA

BACKGROUND OF THE INVENTION

Field of the Invention

The present invention relates in general to the field of information handling system visual information presentation, and more particularly to an information handling system on demand display source presentation at a partial display area.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern homes are filled with a variety of smart devices, such as information handling systems like IoT devices that monitor home equipment, such as a door bell, a laundry system, a refrigerator and a home HVAC. In some instances, an end user has to walk to a system and read the system output at what is typically a primitive display. In other instances, smart systems that use IoT type devices are headless, meaning without a display, so that the end user generally has to interact with the device through a phone or other portable information handling system. Some systems can interact through a home network so that an end user can view the system output, such as by visiting a home network URL with a browser on an information handling system. Generally, this means the end user has to interact with an information handling system to call up the visual information for presentation at a display, such as with a browser window.

Many display monitors have a picture-in-picture (PIP) or picture-by-picture (PBP) capability. PIP/PBP capability allows an end user to select a secondary display video source to present visual images of that secondary video source in a small window of the display. PIP/PBP modes are typically manually selected with the end user also manually selecting the secondary video source for presenting visual images. Once a secondary visual source is selected, the PIP/PBP window will typically remain active until an end user interacts with the display to manually turn off the mode. PIP/PBP display areas are generally configured to have a set window size and location. Some displays may offer several PIP/PBP areas, however, selecting multiple sources for multiple partial display areas tends to be complex and time consuming. In addition, the video signal for the source devices must generally be conformed with restricted video formats that the display monitor input can support, such as a fixed resolution. Typically, display hardware is designed so that a PIP/PBP video buffer is hardwired with the video interface and thus not flexible to adapt to different types of input sources.

SUMMARY OF THE INVENTION

Therefore, a need has arisen for a system and method which provides an on-demand display source presentation at a partial display area.

In accordance with the present invention, a system and method are provided which substantially reduce the disadvantages and problems associated with previous methods and systems for presenting visual information at a partial display area. A display provides plural interfaced information handling systems with configuration information for presenting visual information at partial display areas so that the information handling systems can initiate presentation of visual information in a partial display area, such as with a picture-in-picture (PIP) or picture-by-picture (PBP) display mode.

More specifically, plural information handling systems interface with a display through a physical or wireless interface, such as a graphics cable, an Ethernet cable, a WiFi interface or other communication mediums. Each of the plural information handling systems executes instructions on a processor to generate visual information and determines that a presentation of the visual information at a part of a display is desired. The information handling system initiates a session with the display to transfer the visual information to a partial video buffer region of the display as defined by a partial video buffer definition and associated with a region of the display to which the partial video buffer writes, such as a PIP or PBP region of the display. In one embodiment, the secondary visual information presented at the part of the display panel is directed to the video buffer by a multiplexor so that a timing controller can scan the secondary visual information to the display panel from the video buffer along with the primary visual information presented at the display panel.

The present invention provides a number of important technical advantages. One example of an important technical advantage is that a display architecture is provided that renders any video inputs from plural information handling systems to a PIP/PBP display area. A display tracks available memory and display area for presenting secondary visual information at a part of the display and provides that capability to plural interfaced information handling systems for a decentralized assignment of display resources, such as through a network. A communications protocol is provided that supports remote setup and access to display resources by a variety of types of information handling systems so that an end user has visual information available in a useful manner. For example, a door bell with a camera that detects a visitor establishes a display session to present the camera image at a portion of a display where an end user is working, thus providing the end user with information regarding the visitor with minimal disruption. As another example, an IoT enabled dryer might initiate a session to present a laundry status when a load finishes. In a work-from-home scenario, an end user may track smart devices while working at a display with minimal disruptions or interactions by the end user as information handling systems initiate partial display presentations as needed and without end user interventions to select a video source.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A display is configured to present primary visual images of a primary information handling system and secondary visual images of a secondary information handling system supported by picture-in-picture and/or picture-by-picture formats. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
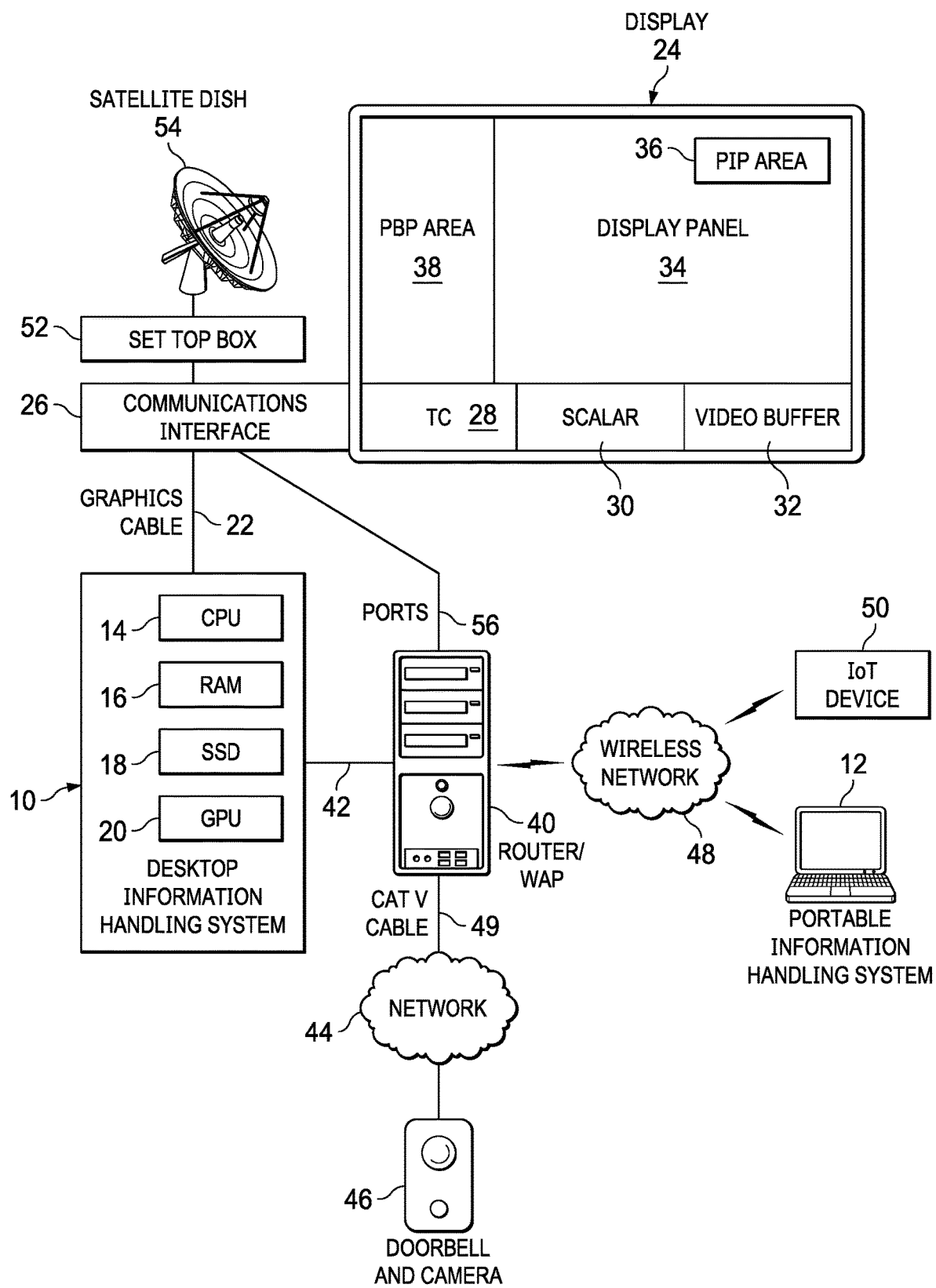
FIG. 1 depicts a block diagram of a display configured to present primary visual images and secondary visual images from plural information handling systems supported by picture-in-picture and/or picture-by-picture formats.

Referring now to FIG. 1, a block diagram depicts a display 24 configured to present primary visual images and secondary visual images from plural information handling systems 10, 12, 46 and/or 50 supported by picture-in-picture and/or picture-by-picture formats. Information handling system 10 has a desktop configuration with a stationary housing that contains processing components that cooperate to process information. For instance, a central processing unit (CPU) 14 executes instructions to process information with the instructions and information stored in a random access memory (RAM) 16. A solid state drive (SSD) 18 provides persistent storage of the instructions and information, such as with flash or other non-transitory memory. A graphics processing unit (GPU) 20 interfaces with CPU 14 to further process information for communication to a display and presentation as visual images. Generally, GPU 20 generates pixel values that pixels at display 24 present as colors so that the cumulation of the pixels presents a visual image. A portable information handling system 12 processes information with similar internal components built into a portable housing having an integrated display and configured to present visual images at display 24 as a peripheral device. Another type of information handling system is an Internet of Things (IoT) device 50 having processing components in a small housing and designed primarily to monitor conditions at a larger device, such as temperature of a refrigerator or cycle state of a laundry machine. IoT devices 50 are generally "headless" devices that do not include a display and are instead typically configured to send information to a centralized location for presentation. Another example of an IoT device is a door bell and camera device 46 that monitors a door or entrance and sends a video of the door or entrance if an individual is detected, such as with a motion detector or press of a door bell button. In various embodiments, a variety of other types of information handling systems may be used to present visual images at display 24 as described herein.

Display 24 is configured to accept multiple inputs at a communications interface 26 and select an input for presentation across all of pixels of a display panel 34. For instance, communications interface 26 includes plural ports 56 that each accept a cable that communicates visual information, such as pixel values. Ports 56 may include DisplayPort, HDMI, USB Type C, Cat V Ethernet and other types of ports. In one example embodiment, display 24 is a television that accepts television signals from a set top box 52, such as cable television signals, Internet communications or a satellite dish 54. In another example embodiment, a graphics cable 22 carries visual information to communications interface 26 from desktop information handling system 10 or from a router/wireless access point 40 through a network cable 42 that receives visual information from networked devices. For instance, door bell and camera 46 interfaces with a local area network (LAN) 44 through a Cat V cable 49, and a wireless local area network (WLAN) 48 interfaces portable information handling system 12 and IoT device 50.

Display 24 presents visual images of an information handling system with a timing controller 28 that scans pixel values stored in a video buffer 32 to pixels of display panel 34. A scalar 30 adjusts the resolution of visual information received from communications interface 26 to fit to the resolution of pixels disposed in display panel 34, such as by converting High Definition visual information to Ultra High Definition visual information. In addition to presenting a primary visual image at display panel 34, the example embodiment also supports a picture-in-picture (PIP) display area 36 and a picture-by-picture (PBP) display area 38, which each support presentation of secondary visual images with a reduced resolution. PIP area 36 and PBP area 38 may have a defined size that scalar 30 uses to convert a secondary visual information source to the defined size resolution or may have a definable size that an end user can configure. A conventional display presents PIP area 36 and PBP area 38 when an end user selects a secondary source at communications interface 26 to present or a second visual information stream from a single source where available, such as two different television channels. In the example embodiment, PIP area 36 and/or PBP area 38 may be dynamically initiated by information handling systems interface with display 24 through a cable or network interface so that an end user is automatically provided with visual information in an automated and straight forward manner as described in greater detail below.

Figure 2:
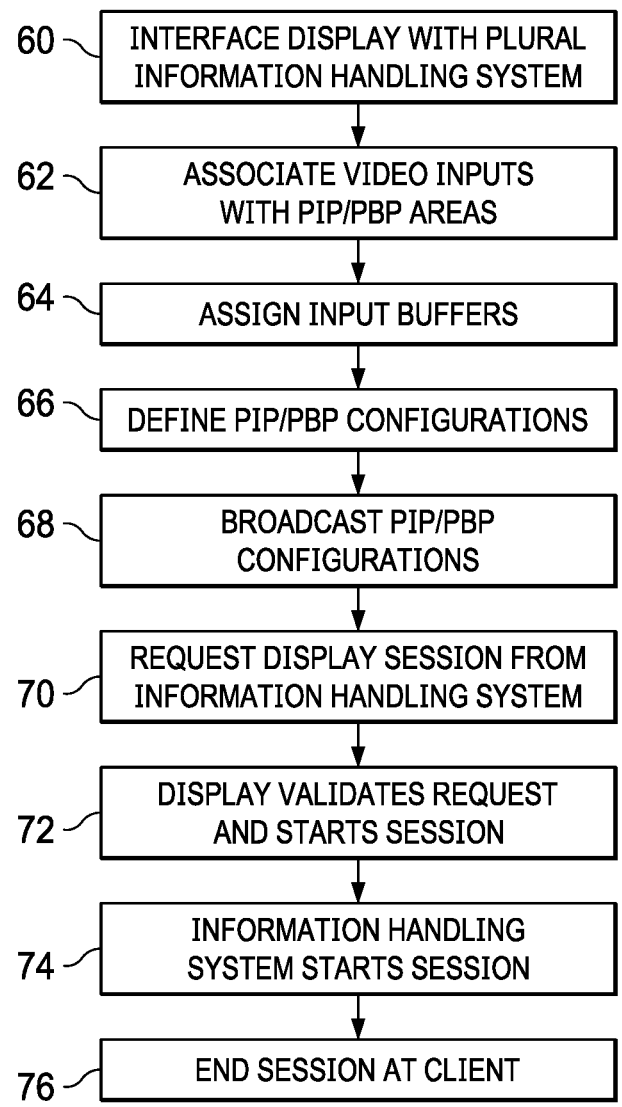
FIG. 2 depicts a flow diagram of a process for managing presentation of visual images from plural information handling systems supported by picture-in-picture and/or picture-by-picture formats.

Referring now to FIG. 2, a flow diagram depicts a process for managing presentation of visual images from plural information handling systems supported by picture-in-picture and/or picture-by-picture formats. The process starts at step 60 by interfacing a display with plural information handling systems, such as with direct cable connections to a display port or through network interfaces. At step 62, video inputs are associated with PIP and/or PBP areas. Conventional displays configure video interfaces as PIP/PBP sources through a hardware design that assigns PIP/PBP sources to a PIP/PBP buffer of a defined size so that selection of a PIP/PBP presentation by an end user presents the PIP/PBP selected video source in a defined display area. The present disclosure defines areas of the display as accessible by a PIP/PBP selection initiated from an external device and managed as a communication session. At step 64 an input buffer is assigned for a PIP/PBP session request, such as based upon a type of connection to the display used by the information handling system making the session request. Decoding of visual information on an interface starts after the external information handling system is granted a PIP/PBP session by the display and is supported on the communication interface at a video stream input identified by PIP/PBP session request from the information handling system.

Figure 3:
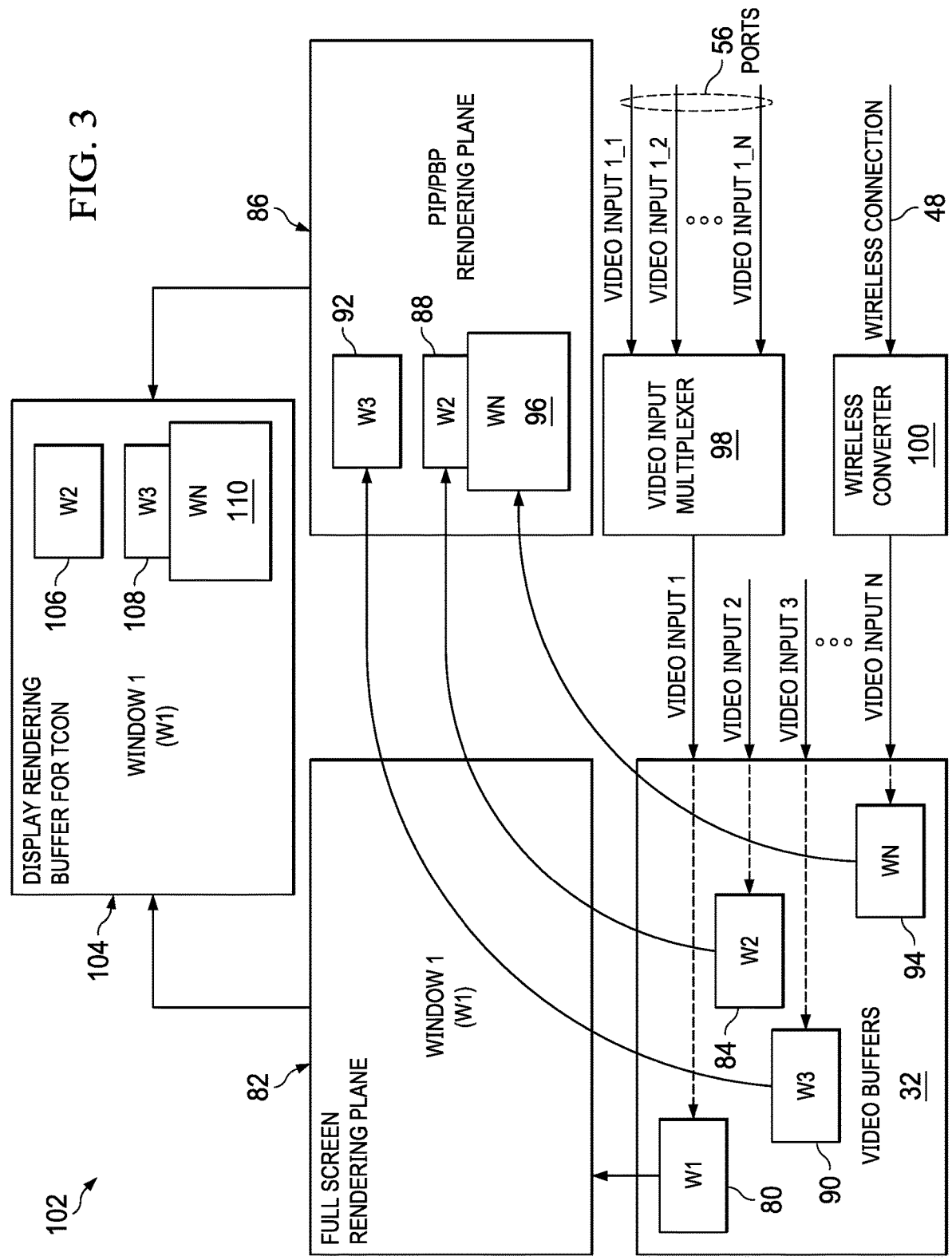
FIG. 3 depicts a block diagram of a system architecture for plural picture-in-picture and/or picture-by-picture video renderings at a display.

Referring now to FIG. 3, a block diagram depicts a system architecture for plural picture-in-picture and/or picture-by-picture video renderings at a display. FIG. 3 provides an example of a video source input, memory and display area association with steps 60, 62 and 64 of FIG. 2. In the example embodiment, plural video inputs are provided to the display through plural ports 56 and to a video input multiplexor 98 that selectively directs the inputs to locations within video buffer 32. For instance, video inputs may couple through VGA, HDMI, DP and USB-C ports as well as a wireless connection 48 that interfaces through a wireless converter 100. In some instances, various video inputs may include multiple video streams, such as DP in MST mode, so that each video stream may be managed as an input by video input multiplexor 98. Video input multiplexor 98 routes video information to partial video buffer regions based upon communication sessions that are established with plural information handling systems interfaced to ports 56 or through wireless connections 48. In the example embodiment, video buffer 32 has a region W1 associated with a primary full screen rendering plane 82. In normal single source operation, video buffer 32 region W1 80 is provided to the timing controller for rendering as shown at 102 with the entire display area 104 presenting the single video source. Partial video buffer regions W2 84, W3 90 and Wn 94 accept video inputs for presentation at a PIP/PBP rendering plane 86 at display locations indicated by W3 92, W2 88 and Wn 96. The timing controller renders video information as pixel values to the display panel by scanning the pixel values from display rendering buffer 102. A processing resource, such as a microcontroller of the timing controller of scalar, defines for the timing controller which of the partial video buffer regions W2 106, W3 108 and Wn 110 are included in display rendering buffer for the timing controller 102. Ultimately, initiation of presentation of secondary visual images from a partial video buffer region is performed by the external information handling system that establishes a network or other session to communicate the video information to the partial buffer region through video input multiplexor 98. The external information handling system may provide the visual information scaled to fit in the partial video buffer for the associated PIP/PBP rendering plane 86, or alternatively the scalar may scale the visual information to a resolution of the display area of the PIP/PBP area. In one embodiment, the external information handling system may define the size of the PIP/PBP area, such as to match a display resolution used by the information handling system. For instance, a headless IoT device may have a very basic user interface to present a value, such as temperature, that is defined as needed to minimize processing at the display and ensure a desired image quality.

Figure 4:
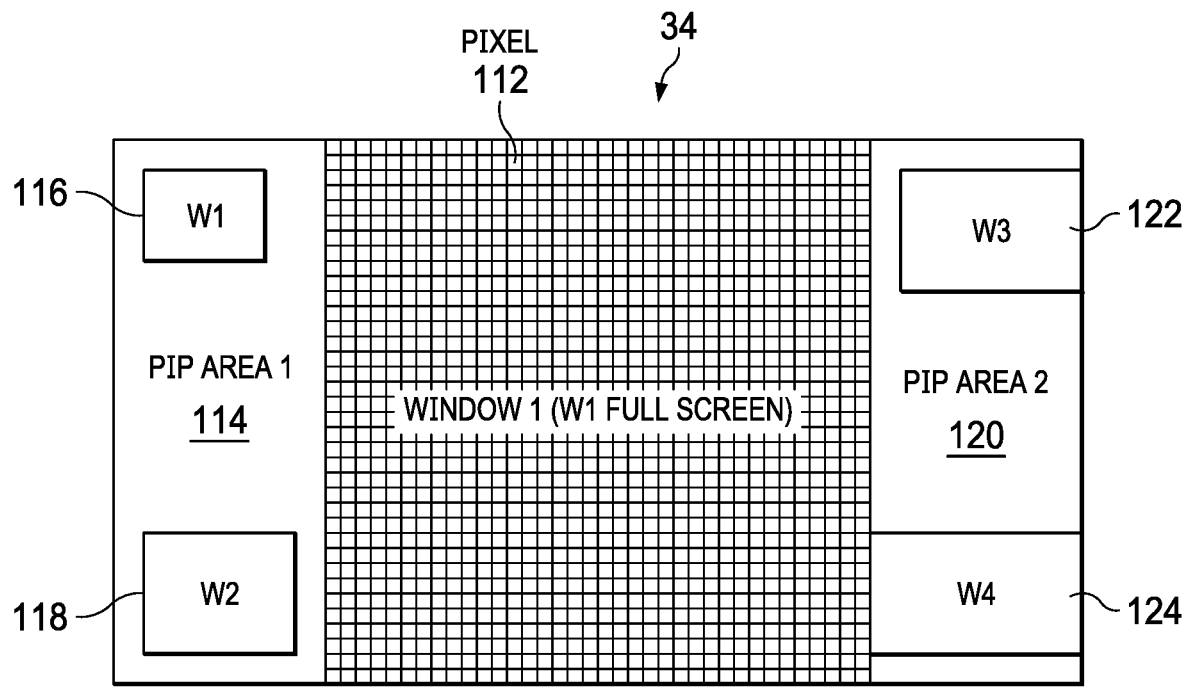
FIG. 4 depicts a display configuration for picture-in-picture video rendering.
Figure 5:
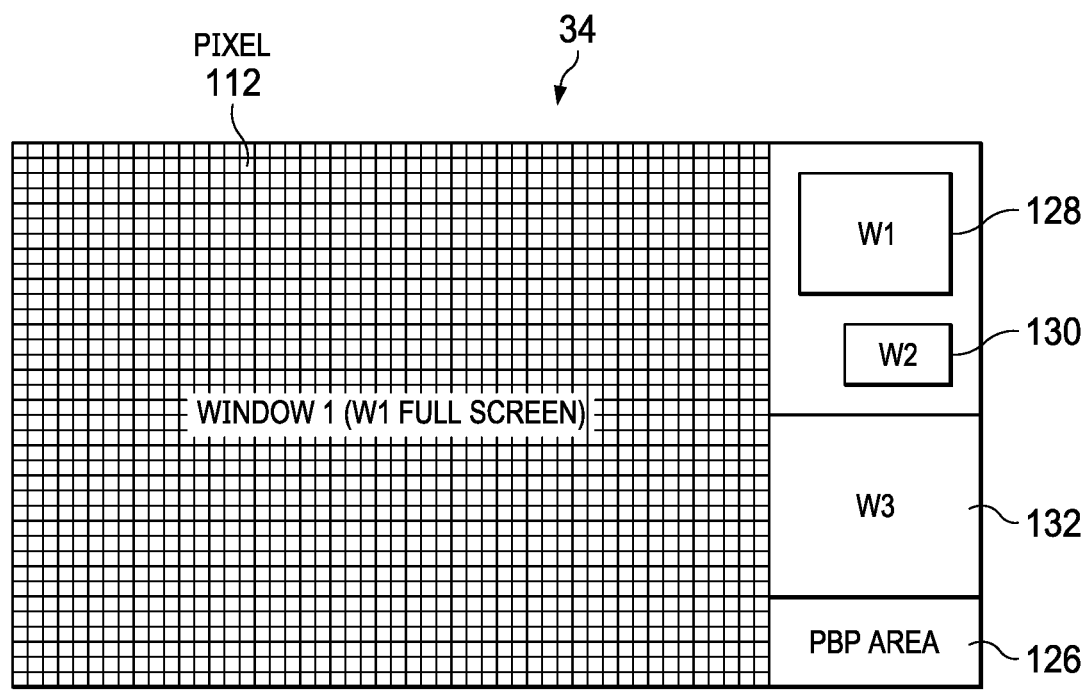
FIG. 5 depicts a display configuration for picture-by-picture video rendering.

Returning to FIG. 2, after step 64 the process continues to step 66 to define PIP/PBP configurations. Information handling systems interfaced with the display are provided with the size of available partial presentation areas, such as defined PIP/PBP areas, and are free to associate with a selected area by associating with the partial video buffer area. That is, requests for PIP/PBP rendering from client information handling systems are event driven so that input buffer is allocated from a global memory pool of the display rather than statically assigned. When a PIP/PBP display area is active, a pointer to the associated memory location can direct the timing controller scan between the primary and secondary visual images as appropriate. Referring to FIG. 4, a display configuration for picture-in-picture video rendering, and referring to FIG. 5, a display configuration for picture-by-picture video rendering. In each case, pixels 112 of display 34 present visual images based upon pixel values scanned from the video buffer by the timing controller. The number and types of PIP/PBP areas available for presentation of visual images relates to the amount of video buffer memory, the resolution of the display and the color depth of the pixel values. FIG. 3 depicts an example in which two PIP areas 114 and 120 support a total of four available PIP areas 116, 118, 122 and 124 for simultaneous presentation. FIG. 5 depicts a single PBP area 126 that supports three separate PBP areas 128, 130 and 132. In order to communicate the display PIP/PBP capabilities, two data sets are defined to manage the configuration and capability of PIP/PBP functions:

```
PIP_PBP_Configuration {
PIP mode or PBP mode;
display areas for PIP windows[ ]:
{H_start, V_start, H_end, V_end}
display areas for PBP windows[ ]:
{ H_start, V_start, H_end, V_end}
the max PIP windows;
the max PBP windows;
the max PIP resolution:
{H_pip_max, V_pip_max};
the max PBP resolution:
{H_pbp_max, V_pbp_max}
The max PIP size:
{H_pip_size, V_pip_size}
the max PBP size:
{H_pip_size, V_pbp_szie};
PIP overlay and transparency level;
PBP overlay;
}
```

The configuration items have the following definitions:

"PIP mode or PBP mode": full screen mode, PIP mode or PBP mode;
"display areas for PxP windows": the rectangle areas assigned for PIP or PBP rendering;
"the max PxP windows": the most PIP or PBP windows;
"the max PxP resolution": the max width and height (in pixels) for PxP windows;
"the max PxP size": the max width and height (in inches), for client specifies the physical size rather than pixel resolution;
Content will be scaled to fit the allocated window.
As monitor's PIP is known, H__pxp__max = monitor__H__PPI*H__pip__size;
"PIP overlay and transparency level": allow PIP windows to render in Z-order with transparency.
"PBP overlay": allow PBP windows to render overlay. However PBP has no transparency.
PIP__PBP__Capability}
PIP mode: [ON/OFF];
PBP mode: [ON/OFF];
Remaining display areas for PIP windows [ ]:
{H__start, V__start, H__end, V__end};
Remaining display areas for PBP windows [ ]:
{H__start, V__start, H__end, V__end};
Remaining number of PIP windows [ ];
Remaining number of PBP windows [ ];
the max resolution for PIP windows:
{H__pip__max, V__pip__max};
the max resolution for PBP windows:
{H__pbp__max, V__pbp__max};
the max size for PIP windows:
{H__pip__max, V__pip__max};
the max size for PBP windows:
{H__pbp__max, V__pbp__max};
PIP overlay enabling: [ON/OFF];
PIP windows transparency level: [ ]Min%(top), Max%
PBP overlay enabling: [ON/OFF];
}

The capability dataset reflects the current state of support PIP/PBP functions. The initial capability state is the display's supported configuration. When an information handling system initiates or ends a PIP/PBP session, the capability dataset is updated and broadcast to information handling systems so that each client of the display can decide what capability to request.

Returning to FIG. 2, once the display configuration and capability datasets are up to date, the process continues to step 68 to broadcast the PIP/PBP configurations to information handling systems interfaced with the display so that the information handling systems can initiate use of partial display areas. For example, an information handling system listens for a broadcast command by the display of Cap Broadcast(PIP_PBP_Capability) or queries the display with a Cap Request(PIP_PBP_Capability) command to which the display responds with the Cap Reply(PIP_PBP_Capability) command. Once the information handling systems have the display capabilities and availability, the process continues to step 70 for an information handling system interface with the display to request a session for presentation of visual information at a part of the display panel pixels. The client information handling system first determines that the partial display area presentation is available, that the available area is suitable, and that the area size to be requested is allowed by the display. If the display supports the desired partial display area presentation, the information handling system requests the display session with as Session_Request(Sessions_Parameters) command that includes the desired session parameters, such as whether a PIP or PBP mode is requested, the video stream identifier, the partial display area position, size and transparency level. At step 72, the display validates the request and starts the partial area display session. At step 74 with the start of the session, the display replies with Session_Reply(OK/FAILURE) and then updates the capabilities to reflect the use of any partial display areas. Visual information transfer is then initiated with a Session_Start(Content MetaData) command to request the content for rendering from the partial video buffer. In one embodiment, the content metadata aids the display in a determination of format for presentation. While the video signal is provided by the information handling system, the display decodes the video stream to the input buffer and renders the video, and once the visual image is successfully rendered or a failure occurs, the monitor sends a Session_Alive( ) or Session_Reply(FAILURE_Codes) to the information handling system. When a rendering event is complete for the client, the process continues to step 76 to end the session by sending a Session_End( ) command. The display then reacquires the partial area presentation capability and updates the dataset, and then acknowledges the session end with a Session_Terminated( ) command.

Figure 6:
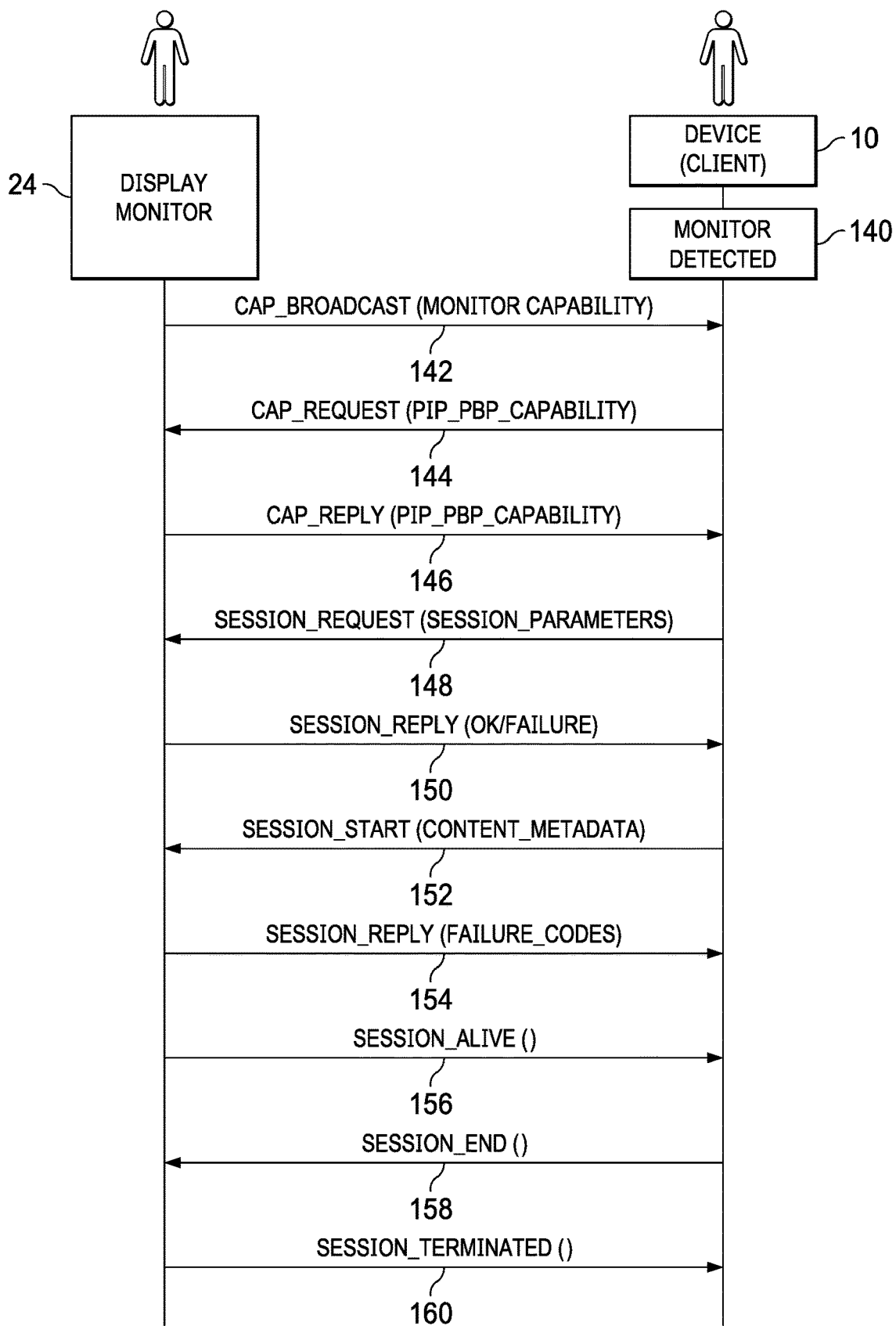
FIG. 6 depicts a sequence diagram for picture-in-picture and picture-by-picture session processing.

Referring now to FIG. 6, a sequence diagram for picture-in-picture and picture-by-picture session processing is depicted. The process starts at display 24 and display monitor detection at 140 with step 142 at which the monitor broadcasts the partial display capability. At 144, an information handling system requests the capability from the display and, at 146 the display responds with available capability. At 148, the information handling system communicates a session request to initiate presentation of visual information a part of the display. At 150, the display responds by communicating a session reply with a success or failure of the session request. Assuming the session request is a success, at 152 the information handling system sends a session start command with the content metadata type. At 154 and 156, the display responds with a failure or a session alive command. Once a session is started, the display presents the visual information until at 158 the information handling system sends a session end command. At 160, the display responds to the session end with a session terminated command and updates the display capabilities to indicate partial display presentation availability.

Although the present invention has been described in detail, it should be understood that various changes, substitutions and alterations can be made hereto without departing from the spirit and scope of the invention as defined by the appended claims.

What is claimed is:

1. A method for presenting visual images at a display having a display area, the method comprising:
defining within a video buffer of the display plural partial video buffer region definitions;
communicating the plural video buffer partial region definitions to plural information handling systems;
presenting first visual images at the display across the full display area from a first of the plural information handling systems by writing the first visual images to the video buffer;
communicating second visual images from a second of the plural information handling systems to the display, the second visual images formatted to fit into a selected of the plural partial video buffer region definitions; and
presenting the second visual images instead of the first visual images at a portion of the display area corresponding to the selected of the plural partial video buffer region definitions.

2. The method of claim 1 the presenting the first visual images and the presenting the second visual images further comprises:

scanning the video buffer to pixels of the display area with a timing controller;
presenting the second visual images by the scanning of the selected of the plural partial video buffer region; and
presenting the first visual images by the scanning of the video buffer other than the partial video buffer region.

3. The method of claim 1 further comprising:
communicating the first and second visual images to a multiplexor; and
writing the first and second visual images to the video buffer as a composite image from the multiplexor.

4. The method of claim 1 wherein the display plural partial video buffer region definitions are formatted to present at the display area as picture-in-picture areas.

5. The method of claim 1 wherein the plural partial video buffer region definitions are formatted to present at the display area as picture-by-picture areas.

6. The method of claim 1 further comprising:
communicating from the second information handling system to the display a size of the selected of the plural partial video buffer region definitions;
scaling the second visual images at the second information handling system to fit in the size; and
communicating the second visual images as a video stream of the size.

7. The method of claim 1 wherein the first information handling system comprises a set top box and the second information handling system comprises a doorbell monitor.

8. The method of claim 1 wherein:
the first information handling system comprises a desktop information handling system executing a word processing application to generate the first visual image of a word processing document; and
the second information handling system comprises a headless Internet of Things device.

9. The method of claim 1 further comprising:
communicating the second visual images from the second information handling system to the first information handling system through a network; and
communicating the first and second visual images to the display through a multi-stream capable protocol.

10. A display comprising:
a display panel having plural pixels, each pixel operable to present a color defined by a pixel value;
a video buffer configured to store the pixel values for presentation of visual images at the pixels of the display panel;
a timing controller interfaced with the video buffer and configured to scan the pixel values to the pixels of the display panel;
a communication interface operable to accept the pixel values from plural information handling systems;
a processing resource operable to execute instructions; and
non-transitory memory interfaced with the processing resource and storing instructions that when executed on the processing resource cause:
presentation of first visual images at the plural pixels from a first of the plural information handling systems, the first visual images stored as first pixel values in the video buffer;
communication of plural video buffer partial region definitions to the plural information handling systems;
application of a video buffer partial region definition received from a second of the plural information handling systems to store second pixel values communicated from the second of the plural information handling systems in at a partial region of the video buffer corresponding to the video buffer partial region definition in the place of the first pixel values associated with the partial region definition of the video buffer.

11. The display of claim 10 wherein:
the communication interface comprises plural communication ports; and
the first information handling system couples to a first of the communication ports; and
the second information handling system couples to a second of the communication ports.

12. The display of claim 11 further comprising:
a multiplexer interfaced with the first and second communication ports and the video buffer, the multiplexor writing the second pixel values to the video buffer partial buffer region and the first pixel values to the remainder of the video buffer.

13. The display of claim 10 wherein:
the communication interface comprises a port having a multi-stream protocol; and
the first information handling system includes the second pixel values with the first pixel values with the multi-stream protocol.

14. The display of claim 10 wherein the display video buffer partial region definitions are formatted to present at the display area as picture-in-picture areas.

15. The display of claim 10 wherein the display video buffer partial region definitions are formatted to present at the display area as picture-by-picture areas.

16. The display of claim 15 further comprising:
a scalar interfaced with the video buffer and the communication interface;
wherein the scalar receives the second pixel values from the second information handling system at a first resolution, scales the second pixel values to a resolution that fits the video buffer partial region definition and writes the second pixel values to the video buffer.

17. A method for coordinating presentation of visual information at a display from plural information handling systems, the method comprising:
broadcasting from the display to a network plural partial video buffer region definitions of the display;
receiving the plural partial video buffer region definitions at a first information handling system through the network;
requesting from the first information handling system to the display through the network to present first visual images at a selected portion of the display associated with the one or more of the plural partial video buffer region definitions;
in response to the requesting, establishing a network session between the display and the first information handling system;
communicating through the session first visual image information sized to fit in the one or more of the plural partial video buffer region definitions; and
writing the first visual information to a video buffer of the display for the one or more of the plural partial video buffer region definitions to present the first visual images at the display.

18. The method of claim 17 wherein the first information handling system comprises a door bell and the first visual image information comprises a visual image capture by a camera of the door bell.

19. The method of claim 17 comprising:
writing second visual information to the video buffer from a second information handling system, the second visual information defining a second visual images stored in the video buffer except at the one or more of the plural partial video buffer region definitions;
presenting the first visual image at the display in a first area associated with the one or more of the plural partial video buffer regions; and
presenting the second visual image at all of the display except the first area.

20. The method of claim 19 wherein the second information handling system comprises a headless Internet of Things device.

\* \* \* \* \*